United States Patent
Jedlicka et al.

(10) Patent No.: US 11,162,211 B1
(45) Date of Patent: Nov. 2, 2021

(54) FABRIC DRYING APPARATUS

(71) Applicants: Kim Jedlicka, Leigh, NE (US); Chase Grape, Omaha, NE (US)

(72) Inventors: Kim Jedlicka, Leigh, NE (US); Chase Grape, Omaha, NE (US)

( * ) Notice: Subject to any disclaimer, the term of this patent is extended or adjusted under 35 U.S.C. 154(b) by 0 days.

(21) Appl. No.: 16/293,297

(22) Filed: Mar. 5, 2019

Related U.S. Application Data

(60) Provisional application No. 62/638,872, filed on Mar. 5, 2018.

(51) Int. Cl.
| | |
|---|---|
| *D06F 58/10* | (2006.01) |
| *D06F 58/30* | (2020.01) |
| *D06F 57/02* | (2006.01) |
| *F26B 21/08* | (2006.01) |
| *B01D 53/26* | (2006.01) |
| *D06F 59/00* | (2006.01) |
| *D06F 73/00* | (2006.01) |

(52) U.S. Cl.
CPC .......... *D06F 58/10* (2013.01); *B01D 53/261* (2013.01); *D06F 57/02* (2013.01); *D06F 58/30* (2020.02); *D06F 59/00* (2013.01); *D06F 73/00* (2013.01); *F26B 21/083* (2013.01)

(58) Field of Classification Search
CPC .......... D06F 58/10; D06F 59/02; D06F 59/04; A47L 23/20; A47L 23/205; F26B 9/003; F26B 21/006
See application file for complete search history.

(56) References Cited

U.S. PATENT DOCUMENTS

| | | | | | |
|---|---|---|---|---|---|
| 1,092,726 | A | * | 4/1914 | Lendle | D06F 73/00 223/70 |
| 2,094,042 | A | * | 9/1937 | Lighterman | D06F 73/00 34/106 |
| 3,464,186 | A | * | 9/1969 | Walker | B01D 53/26 96/115 |
| 3,513,564 | A | * | 5/1970 | Gramprie | F26B 21/006 34/104 |
| 3,645,009 | A | * | 2/1972 | Ketchum | A47L 23/205 34/104 |
| 3,858,331 | A | * | 1/1975 | Lord | D06F 58/10 34/621 |
| 4,200,993 | A | * | 5/1980 | Blanc | A43D 3/1491 211/34 |
| 4,816,047 | A | * | 3/1989 | Neal | B01D 53/261 55/475 |
| 5,222,308 | A | * | 6/1993 | Barker | A47L 23/205 34/104 |
| 5,403,387 | A | * | 4/1995 | Flynn | B01D 53/0415 96/143 |
| 5,592,750 | A | * | 1/1997 | Eichten | D06F 59/02 223/70 |

(Continued)

*Primary Examiner* — David J Laux
(74) *Attorney, Agent, or Firm* — Suiter Swantz pc llo (57) ABSTRACT

An apparatus for drying articles of fabric is disclosed. In one embodiment, the apparatus includes a frame configured to receive an article of fabric. In another embodiment, the apparatus includes a base coupled to the frame. In another embodiment, the apparatus includes a fan disposed within at least one of the frame or the base, wherein the fan is configured to direct an air stream through the frame to a surface of the article of fabric in order to dry the article of fabric.

13 Claims, 6 Drawing Sheets

(56) References Cited

U.S. PATENT DOCUMENTS

| | | | | |
|---|---|---|---|---|
| 5,681,370 A * | 10/1997 | McMahon | B01D 53/261 | 95/105 |
| 6,327,792 B1 * | 12/2001 | Hebert | A43D 3/1491 | 34/104 |
| 6,553,687 B1 * | 4/2003 | Leamon, Jr. | A42B 3/006 | 34/103 |
| 6,745,496 B2 * | 6/2004 | Cassella | D06F 58/10 | 34/218 |
| 6,766,594 B2 * | 7/2004 | DuRapau | A47L 23/205 | 34/104 |
| 6,880,711 B2 * | 4/2005 | Collier | A47G 25/0671 | 211/85.3 |
| 7,103,989 B2 * | 9/2006 | Rosseau | A47L 23/20 | 34/103 |
| 7,426,791 B2 * | 9/2008 | Martin | D06F 58/20 | 34/607 |
| 8,122,613 B2 * | 2/2012 | Sanders | F24F 3/1603 | 34/565 |
| 8,393,482 B2 * | 3/2013 | Durham | A47L 23/205 | 211/85.7 |
| 8,668,765 B2 * | 3/2014 | Dewald, III | F26B 21/083 | 95/113 |
| 8,991,067 B2 * | 3/2015 | Zielinski | F26B 3/00 | 34/403 |
| 9,856,597 B2 * | 1/2018 | Smoots | F26B 21/008 | |
| 10,145,059 B2 * | 12/2018 | Kim | D06F 58/30 | |
| 10,184,675 B2 * | 1/2019 | Davies | B01D 53/261 | |
| 10,655,914 B2 * | 5/2020 | Seehausen, Jr. | A45D 20/122 | |
| 2003/0222038 A1 * | 12/2003 | Collier | A47G 25/0671 | 211/85.7 |
| 2004/0068888 A1 * | 4/2004 | Lurie | A47L 23/20 | 34/90 |
| 2009/0266851 A1 * | 10/2009 | Perlman | B65D 85/18 | 223/84 |
| 2012/0186098 A1 * | 7/2012 | Williams | D06F 59/02 | 34/240 |
| 2015/0033575 A1 * | 2/2015 | Ciarallo | F26B 25/18 | 34/275 |
| 2016/0318687 A1 * | 11/2016 | Schneider | B01D 53/261 | |
| 2017/0045295 A1 * | 2/2017 | Durham | D06F 59/02 | |
| 2017/0241711 A1 * | 8/2017 | Seehausen, Jr. | F26B 21/006 | |

* cited by examiner

FABRIC DRYING APPARATUS

CROSS-REFERENCE TO RELATED APPLICATION

The present application claims the benefit under 35 U.S.C. § 119(e) of U.S. Provisional Application Ser. No. 62/638,872, filed Mar. 5, 2018, entitled FABRIC DRYING APPARATUS, naming Kim Jedlicka and Chase Grape as inventors, which is incorporated herein by reference in the entirety.

TECHNICAL FIELD

The present invention generally relates to drying articles of fabric and, more particularly, to a fabric drying apparatus.

BACKGROUND

As compared to wet and/or damp towels, dry towels provide a number of benefits over damp towels including increased water retention capabilities and enhanced user comfort. Additionally, drying towels completely in between uses prevents the growth of bacteria leading to fresher, more sanitary towels. While conventional towel racks are simplistic in design and use, conventional towel racks do not provide sufficient drying rates to allow towels to completely dry in between uses. Therefore, it would be desirable to provide an apparatus which may cure the shortfalls of conventional towel racks identified above.

SUMMARY

An apparatus for drying articles of fabric is disclosed. In one embodiment, the apparatus includes a frame configured to receive an article of fabric. In another embodiment, the apparatus includes a base coupled to the frame. In another embodiment, the apparatus includes a fan disposed within at least one of the frame or the base, wherein the fan is configured to direct an air stream through the frame to a surface of the article of fabric in order to dry the article of fabric.

An apparatus for drying articles of fabric is disclosed. In one embodiment, the apparatus includes a frame configured to receive an article of fabric. In another embodiment, the apparatus includes a fan configured to direct an air stream through the frame to a surface of the article of fabric in order to dry the article of fabric. In another embodiment, the apparatus includes one or more sensors. In another embodiment, the apparatus includes a controller configured to generate one or more control signals configured to adjust one or more characteristics of the fan based on at least one of one or more input commands from a user interface, or one or more data readings acquired by the one or more sensors.

A method for drying articles of fabric is disclosed. In one embodiment, the method includes: positioning an article of fabric across an exterior surface of a frame; actuating a fan from an inactive state to an active state; directing an air stream, with the fan, through the frame to a surface of the article of fabric; and actuating the fan from the active state to the inactive state.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. Referring generally to FIGS. 1-5, an apparatus and method for drying fabrics is disclosed, in accordance with one or more embodiments of the present disclosure.

Dry towels provide a number of benefits over their wet towel counterparts. First and foremost, due to the fact that dry towels are not already partially saturated, dry towels may exhibit increased water retention capabilities over a damp or wet towel. Additionally, dry towels may prevent the growth of bacteria and the creation of unpleasant odors. Furthermore, many users simply derive joy and satisfaction from using dry towels.

Embodiments of the present disclosure are directed to a fabric drying apparatus. It is contemplated that embodiments of the present disclosure may be used to dry and warm towels prior to use. In a further embodiment, the present disclosure may be used to adequately dry a towel in the time span of an average shower. For example, it is contemplated that a user may drape a damp towel across the fabric drying apparatus prior to stepping into the shower, and the fabric drying apparatus may completely and/or adequately dry and/or warm the towel by the time the user completes his or her shower. In this example, by the time the user steps out of the shower, they may have a dry and/or warm towel with which to dry off.

In one embodiment, the fabric drying apparatus includes a frame configured to receive an article of fabric (e.g., a towel). In this regard, the frame is configured to allow a towel to be draped over the frame. In another embodiment, the frame allows for air to pass through the frame. In another embodiment, the apparatus includes a fan. In another embodiment, the apparatus includes one or more heating elements. In another embodiment, the one or more heating elements and/or the fan may be configured to direct warm air through the frame. In this regard, the apparatus may be configured to transfer warm air through the frame to a towel draped across the frame. It is noted that warm air directed through the frame to the towel may increase the rate at which moisture is dissipated from the towel, thereby drying and/or warming the towel.

Figure 1:
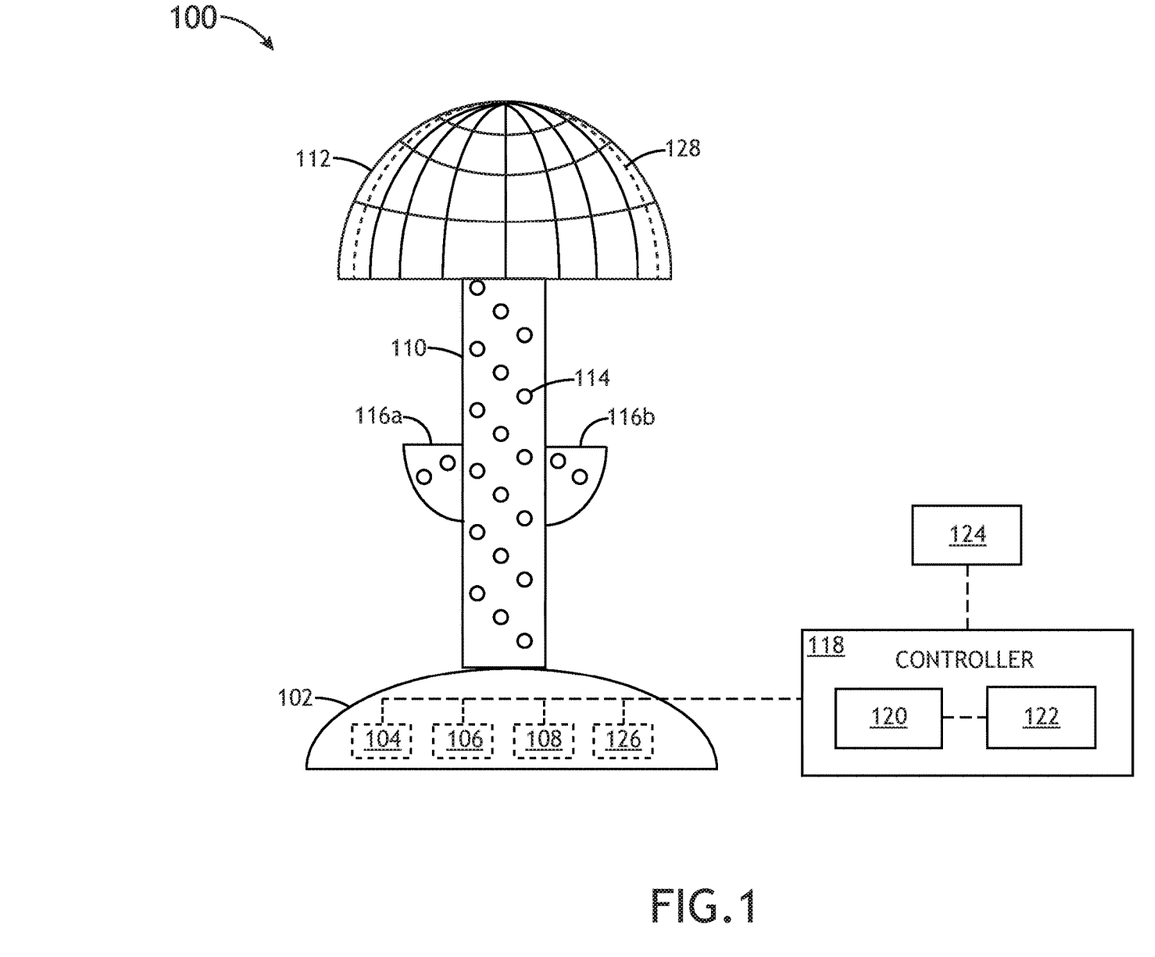
FIG. 1 illustrates a simplified conceptual diagram of an apparatus for drying articles of fabric, in accordance with one or more embodiments of the present disclosure.

FIG. 1 illustrates a simplified conceptual diagram of an apparatus 100 for drying shower towels, in accordance with one or more embodiments of the present disclosure.

In one embodiment, apparatus 100 includes a base 102, a fan 104, a heating device 106, a power source 108, a controller 118, a body 110, and a frame 112. The apparatus 100 may further include one or more sensors 126 and a desiccant material (e.g., desiccant structure 128). In one embodiment, a towel or other fabric material may be draped across the frame 112 such that apparatus 100 may increase the rate at which the towel is dried and/or heated.

In one embodiment, base 102 includes a fan 104. In another embodiment, the base 102 includes one or more heating elements 106. In another embodiment, the base 102 includes a power source 108. In one embodiment, the base 102 includes any base structure which allows the apparatus 100 to be placed on a surface and remain in a desired orientation. For example, base 102, as depicted in FIG. 1, may allow apparatus 100 to be placed on the floor or a countertop and remain in a substantially upright position.

In another embodiment, a fan 104 may be configured to direct an air stream from the base 102 to the body 110 and frame 112. In another embodiment, base 102 may include one or more vents (not shown) which may allow air to enter base 102. In this regard, one or more holes (not shown) may allow fan 104 to direct an air stream entering the base 102 through the one or more vents (not shown) from the base 102 to the body 110 and frame 112. It is noted that fan 104 may include any device known in the art which is configured to direct an air stream. For example, fan 104 may include, but is not limited to, an axial-flow fan, a centrifugal fan, a cross-flow fan, a helical blade agitator fan, a spiral/auger type fan, a blower, an oscillating fan, an omnidirectional fan, a rotating fan, and the like.

In another embodiment, fan 104 may be reversible. For example, fan 104 may be configured in a "blowing" configuration such that fan 104 directs an air stream from the interior of apparatus 100 to the exterior of apparatus 100. By way of another example, fan 104 may be configured in a "sucking" configuration such that fan 104 directs an air stream from the exterior of apparatus 100 to the interior of apparatus 100.

In another embodiment, base 102 may include one or more heating elements 106. In another embodiment, one or more heating elements 106 may be configured to heat the air which is directed by the fan 104 from the base 102 to the body 110 and frame 112. It is noted that the one or more heating elements 106 may include any heating elements known in the art. For example, the one or more heating elements 106 may include, but are not limited to, one or more resistive heaters, one or more ceramic heaters, one or more heat lamps, one or more radiant infrared (IR) heaters, and the like. It is further noted that the one or more heating elements 106 may heat the air directed by the fan 104 before the fan 104, after the fan 104, or both. For example, base 102 may include one or more vents (not shown) on a bottom surface of base 102 which allows air to enter the base 102. One or more heating elements 106 may be placed beneath the fan 104 such that an air inlet stream entering the base 102 through the one or more vents (not shown) is heated before contacting the fan 104 and being directed from the base 102 to the body 110 and frame 112. Alternatively, by way of another example, an air inlet stream may enter the base 102 through one or more vents (not shown), encounter the fan 104 and then be heated by one or more heating elements 106 as the air is directed from the base 102 to the body 110 and frame 112 as an air stream. By way of another example, one or more heating elements 106 may heat the air before the air encounters the fan 104, and one or more additional heating elements 106 may heat the air after the air is directed by the fan 104 from the base 102 to the body 110 and frame 112.

It is contemplated that fan 104 and one or more heating elements 106 may include separate, distinct elements. Alternatively, it is contemplated that fan 104 and one or more heating elements 106 may be housed in a single device. For example, a blower which includes heating elements is within the scope of the present disclosure.

In another embodiment, base 102 may include a power source 108. It is noted that power source 108 may include any power source known in the art including, but not limited to, batteries, rechargeable batteries, an electrical cord and plug communicatively couplable to an electrical outlet, and the like. In this regard, it is noted that power source 108 may be located inside base 102, outside base 102, or both inside and outside base 102. In one embodiment, power source 108 may provide sufficient current and voltage to fan 104 and one or more heating elements 106 for the operation of the towel drying apparatus 100 without posing electrical shock hazards to a user.

In another embodiment, apparatus 100 may include a controller 118. The controller 118 may include one or more processors 120 and a memory 122, wherein the one or more processors 120 are configured to execute a set of program instructions stored in memory 122, wherein the set of program instructions are configured to cause the one or more processors 120 to carry out the various steps/functions of the present disclosure. In one embodiment, the controller 118 is communicatively coupled to various other components of apparatus 100. For example, controller 118 may be communicatively coupled to the fan 104, one or more heating elements 106, and the power source 108. In this regard, the controller 118 may be configured to generate one or more signals, wherein the one or more signals are configured to adjust one or more characteristics of apparatus 100.

While FIG. 1 illustrates the controller 118 separate from (e.g., in a separate housing) the base 102, this is not to be regarded as a limitation of the present disclosure, unless noted otherwise herein. In this regard, it is contemplated herein that the controller 118, one or more processors 120, and memory 122 may be disposed within the base 102. In an additional and/or alternative embodiment, the controller 118 may be disposed within a separate housing separate from the body 102. In embodiments where the controller 118 is disposed in a location separate from the body 102, the controller 118 may be communicatively coupled to other components of apparatus 100 using any wireline (e.g., copper wire, fiber optic cable, and the like) or wireless (e.g., RF coupling, IR coupling, data network communication, WiFi, WiMax, Bluetooth, 3G, 4G, 4G LTE, 5G, and the like) techniques known in the art.

In another embodiment, controller 118 may include a user interface 124 communicatively coupled to the controller 118. It is contemplated herein that the user interface 124 may include any user input device known in the art. For example, a user input device may include, but is not limited to, a keyboard, a keypad, a touchscreen, a scroll bar, a steering wheel, a joystick, buttons, switches, timers, dials, and the like. Those skilled in the art should recognize that a large number of user input devices may be suitable for implementation in the present invention, and that the present invention is not limited to those user input devices listed herein. In one embodiment, the user interface 124 (e.g., user input device) may be configured to receive one or more input commands from a user. The one or more processors 120 may then be configured to receive the one or more input commands and generate one or more control signals configured to adjust one or more characteristics of the apparatus 100.

For example, apparatus 100 may include a controller 118 disposed within the base 102. The apparatus 100 may further include a user interface 124 including one or more buttons disposed on the body 110. A user may press a button of the user interface 124 (e.g., input command), wherein the input command is configured to turn the fan 104 and/or one or more heating elements 106 into an active state. The one or more processors 120 may then be configured to generate one or more control signals configured to turn the fan 104 and/or the one or more heating elements 106 into an active state. Continuing with the same example, the user may subsequently press a button of the user interface 124 again, wherein the input command is configured to turn the fan 104 and/or one or more heating elements 106 into an inactive state. The one or more processors 120 may then be configured to generate one or more control signals configured to turn the fan 104 and/or the one or more heating elements 106 into an inactive state.

In another embodiment, the user interface 124, controller 118, and/or base 102 may include a display configured to display one or more characteristics of the apparatus 100 to a user. The display may include any display known in the art. For example, the display may include, but is not limited to, a liquid crystal display (LCD), an organic light-emitting diode (OLED) based display or a CRT display. Those skilled in the art should recognize that any display device capable of integration with a user interface is suitable for implementation in the present disclosure. In another embodiment, a user may input selections and/or instructions responsive to data displayed to the user via the user interface. Characteristics and/or settings of the system which may be adjusted by a user may include, but are not limited to, the rate of the fan 104, the heating degree of the heating elements 106, the run time for the apparatus 100, and the like.

In one embodiment, the one or more processors 120 of controller 118 may be configured to automatically adjust one or more characteristics of apparatus 100. For example, the one or more processors 120 may be configured to cause the fan 104 and/or one or more heating elements 106 to operate in an active state for a pre-defined timeframe. By way of another example, the one or more processors 120 may be configured to cause the fan 104 and/or one or more heating elements 106 to operate in an active state until a particular condition or characteristic is present. For instance, apparatus 100 may include one or more sensors 126 communicatively coupled to controller 118. The one or more sensors 126 may be configured to acquire data readings regarding characteristics of the air within and/or around apparatus 100. The one or more sensors 126 may include, but are not limited to, one or more temperature sensors, one or more humidity sensors, one or more moisture sensors, and the like. Continuing with this example, the one or more processors 120 may be configured to cause the fan 104 and/or one or more heating elements 106 to operate in an active state until the one or more humidity sensors 126 acquire data indicating that a pre-defined humidity level has been reached, wherein the pre-defined humidity level indicates a sufficiently dried/heated towel.

While the one or more sensors 126 are illustrated in FIG. 1 as being disposed within the base 102, this is not to be regarded as a limitation of the present disclosure, unless noted otherwise herein. In this regard, the one or more sensors 126 may be disposed within the base 102, within the frame 112, and the like. By way of another example, the one or more sensors 126 may be positioned outside of the base 102 and/or frame 112. For example, in embodiments where the controller 118 is positioned in a separate housing from the base 102/frame 112, the one or more sensors 126 may be disposed within the controller housing. For instance, in embodiments where the controller 118 is disposed on a wall above and/or adjacent to the frame 112, the one or more sensors 126 may be disposed within the controller 118 housing such that the one or more sensors 126 are configured to collect (e.g., temperature, moisture, humidity, and the like) data (e.g., temperature, moisture, humidity, and the like) regarding the air stream which has passed through an article of clothing disposed on the frame 112.

For example, in embodiments where the user interface 124 is disposed on/within the base 102, the user interface 124 may include a display configured to display one or more characteristics of the apparatus 100 to a user including, but not limited to, fan 104 speed, temperature, heating level (e.g., heating level of the one or more heating elements 106), power level of power device 108, humidity level, and the like. By way of another example, in embodiments where the user interface 124 is disposed remotely with respect to the base 102, the user interface 124 and/or the base 102 may include a display configured to display one or more characteristics of the apparatus 100 to a user.

As noted previously herein, the controller 118 and/or user interface 124 may be located remotely with respect to the base 102 of apparatus 100. For example, the controller 118 and/or user interface 124 may be disposed on a wall of a bathroom proximate to a light switch of the bathroom, wherein the controller 118 and/or user interface 124 is communicatively coupled to the components of apparatus 100 in a wireline or wireless communication technique. By way of another example, the user interface 124 may include a remote user device including, but not limited to, a smart phone, a tablet, a laptop, a smart watch, and the like. For instance, a smartphone may be communicatively coupled to the controller 118 of apparatus 100 such that a user's smartphone may be used to remotely control and/or view characteristics of apparatus 100. In this example, it is contemplated herein that a user may be able to adjust one or more characteristics of apparatus 100 from a remote location using a wireless communications technique including, but not limited to, 3G, 4G, 4G LTE, 5G, WiFi, and the like.

It is noted that apparatus 100 may be used to dry wet towels and other articles of fabric material. Therefore, apparatus 100 may frequently operate in damp, humid, or wet conditions. In this regard, the components of apparatus 100 (e.g., fan 104, heating elements 106, power source 108, controller 118, and the like) may be designed to operate in wet conditions without corroding or posing electrical and/or fire hazards. In one embodiment, apparatus 100 may include a de-humidifier device in order to facilitate drying. It is noted herein that apparatus 100 may include any de-humidifier known in the art without departing from the spirit and scope of the present disclosure. For example, it is contemplated that apparatus 100 may include a desiccant material in order to facilitate drying. For instance, apparatus 100 may include a desiccant structure 128 disposed within the frame 112. The desiccant structure 128 may include a mesh/lattice structure configured to dry the air stream before the air stream passes through the frame 112 and/or article of fabric. By way of another example, it is contemplated that apparatus 100 may be at least partially created and/or coated with a desiccant material. By further way of example, a desiccant material may be placed under the fan 104 and/or within the base 102 and/or body 110. In embodiments with a desiccant material, it is noted that the desiccant material may include any desiccant material known in the art. The desiccant material may include, but is not limited to, silica, activated charcoal, calcium sulfate, calcium chloride, and the like.

Due to the fact that apparatus 100 will frequently operate in damp, humid conditions, it is contemplated that apparatus 100 may include a fabric and/or air freshening device (not shown) in order to combat the smell of damp, musty towels and other articles of fabric. It is contemplated that the freshener device may include any air freshener and/or fabric freshener devices known in the art. In another embodiment, apparatus 100 may include a sanitizer device configured to kill bacteria. The sanitizer device may include any sanitizer device known in the art including, but not limited to, an ultraviolet (UV) radiant element, a sanitizer light, and the like. It is noted herein that the freshening device and/or the sanitizer device may be disposed anywhere within apparatus 100 including, but not limited to, the base 102, frame 112, controller 118, and the like.

In another embodiment, apparatus 100 may include a body 110 configured to direct air from base 102 to a frame 112. Body 110 may be coupled to base 102 through one or more holes such that air may be directed via the fan 104 from base 102 to body 110. Body 110 may take any shape known in the art which may direct the flow of air including, but not limited to, a substantially cylindrical shape.

It may be desirable to prevent towels to be dried by apparatus 100 from coming into contact with the base 102 and/or the surface in which the apparatus 100 is placed. The surface on which apparatus 100 is placed may be wet (e.g., a bathroom floor), therefore it may be desirable to prevent towels from touching the floor in order to facilitate drying. Similarly, due to the fact that base 102 may include electrical components (e.g., fan 104, heating elements 106, power source 108, controller 118, and the like), it may be desirable to prevent towels from coming into contact with the base 102 in order to prevent electrical and fire hazards. In this regard, it is noted that body 110 may be sized to a specified height such that towels will not come into contact with the base 102 or the surface in which apparatus 100 is placed. By way of another example, apparatus 100 may be configured to be permanently, semi-permanently, or temporarily mounted to a wall such that towels or other articles of fabric do not come into contact with wet surfaces. For instance, apparatus 100 may be configured to be mounted to a wall or other surface (e.g., shower wall surface, bathroom cabinets, and the like) using a hook assembly or suction cup assembly.

In one embodiment, body 110 may be designed such that a towel draped across frame 112 will not come into contact with the base 102 and/or the surface in which apparatus 100 is placed. For example, a standard bath towel is approximately 27 inches by 52 inches in size. In this example, in order for a standard bath towel draped across frame 112 not to reach the base 102, the body 110 may be somewhere between 3 feet and 4 feet in length. In comparison, in order to dry a standard beach towel which is approximately 30 inches by 60 inches in size, body 110 may be somewhere between 4 feet and 5 feet in length.

It is contemplated that apparatus 100 may provide for multiple bodies 110 of varying lengths to be used in apparatus 100. Additionally, or alternatively, it is contemplated that body 110 may have adjustable and/or expandable capabilities such that a user may alter the length of the body 110 (and therefore the length of the apparatus 100) depending on the type of towel or other article of fabric to be dried.

In another embodiment, body 110 may include one or more perforations 114 (e.g., holes) which allow at least a portion of the air stream directed by the fan 104 to exit the body 110. Air exiting the body 110 may allow a towel draped across frame 112 to be more effectively and efficiently dried and/or heated. In another embodiment, body 110 may include one or more vents 116a, 116b. In another embodiment, the one or more vents 116a, 116b may include one or more perforations 114 which may allow at least a portion of the air stream traveling through the body 110 to exit the body 110 through the vents 116a, 116b. It is noted herein that one or more vents 116a, 116b with perforations 114 may allow a towel to be more effectively and evenly dried. Furthermore, it is noted that one or more vents 116a, 116b may further prevent a towel draped across frame 112 to come into contact with the base 102 and/or the surface in which apparatus 100 is placed.

In another embodiment, the body 110 is configured to direct air to the frame 112. In another embodiment, frame 112 may be configured to allow a towel to be draped across the frame 112. In another embodiment, frame 112 may be configured to allow air to pass through the frame 112. In this regard, it is noted that frame 112 may be constructed in any number of ways which may allow air to pass through the frame 112. For example, frame 112 may comprise multiple wires forming a lattice or grid-like pattern, as shown in FIG. 1. By way of another example, frame 112 may include a solid structure, wherein the solid structure includes a set of perforations which allow for the passage of air through the frame 112. It is further noted that frame 112 may include any frame shape known in the art including, but not limited to, substantially spherical, substantially semi-spherical, substantially rectangular, substantially dome-shaped, substantially planar, substantially pyramidal, and the like. It is noted other constructions of frame 112 are within the contemplation of the present disclosure, and that the listed examples are not to be regarded as limiting.

In another embodiment, as discussed previously herein, frame 112 may be configured to allow towels of various sizes to be draped across the frame 112 including, but not limited to, bath towels, beach towels, kitchen towels, hand towels, wash cloths, coats, shirts, pants, and the like. It is noted that apparatus 100 is not limited to drying those items listed herein. In this regard, it is contemplated that apparatus 100 may be used to dry any article of fabric without departing from the spirit and scope of the present disclosure. In this regard, apparatus 100 may be used to dry towels, articles of clothing, bathing suits, wash rags, and the like.

In another embodiment, the frame 112 may be configured to allow a towel to be draped across the frame 112 in such a manner which may minimize bunching and/or folding. In this regard, a towel or other article of fabric may be draped across the frame 112 such that the towel lies substantially flat against the frame 112. It is noted that a towel or other article of fabric draped across the frame 112 substantially evenly (e.g., in a manner which minimizes bunching or folding) may maximize the surface area of the towel which is exposed to air traveling through the frame 112. It is further noted that maximizing the surface area of the towel which is exposed to air traveling through the frame 112 may maximize the rate at which the towel is dried, thereby minimizing the time required to dry. In another embodiment, in order to maximize the rate at which the towel or other article of fabric is dried, the frame 112 facilitates the flow of air through the frame 112 in a predominantly perpendicular direction to the surface of the frame 112. In this regard, it is contemplated that the frame 112 may facilitate the flow of air through the towel or article of fabric in a substantially perpendicular direction in order to maximize the rate at which the towel or article of fabric is dried, thereby minimizing the time required to dry.

In one embodiment, the fan 104 and/or the one or more heating elements 106 may turn on automatically when a towel is draped over the frame 112. In this regard, it is noted that apparatus 100 may include a one or more sensors 126 communicatively coupled to the controller 118. The one or more sensors 126 may be configured to sense when a towel or other article is draped across the frame 112. The one or more sensors 126 may include any sensor known in the art. Including, but is not limited to include, photocell sensors, pressure sensors, moisture sensors, humidity sensors, and the like. In another embodiment, the fan 104 and/or the one or more heating elements 106 may also turn off automatically. In this embodiment, the controller 118 may be configured to adjust one or more characteristics of apparatus 100 (e.g., fan 104 and/or the one or more heating elements 106) in response to data collected by the one or more sensors 126. For instance, the controller 118 may be configured to turn off the fan 104 and/or heating elements 106 when the one or more sensors 126 indicate that a towel draped across the frame 112 is removed from the frame. By further way of example, the controller 118 may be configured to adjust one or more characteristics of apparatus 100 (e.g., fan 104 and/or the one or more heating elements 106) to turn off when data collected by the one or more sensors 126 indicate that a towel draped across the frame 112 is sufficiently dried. In this regard, the fan 104 and/or the one or more heating elements 106 may be controlled by a timer/controller 118 such that the fan 104 and/or the one or more heating elements 106 turn off automatically after a pre-determined time period sufficient to dry the towel. By further way of example, the fan 104 and/or the one or more heating elements 106 may turn off automatically when a moisture sensor 126 determines the towel has been dried sufficiently and/or a pre-defined moisture level is reached.

In another embodiment, apparatus 100 may transmit a notification to a user informing the user that a towel placed on apparatus 100 has been sufficiently dried. For example, a display of user interface 124 may show a notification indicating to a user that an article placed on apparatus 100 has been sufficiently dried. It is noted that a notification transmitted by apparatus 100 may include any type of notification known in the art including, but not limited to, a text message, an email, an automated phone call, a message via a smartphone application, and the like. Furthermore, it is contemplated that apparatus 100 may transmit a notification to any user interface device known in the art including, but not limited to, a cell phone, a smart phone, a tablet, a desktop computer, an Amazon Alexa, and the like.

In this regard, it is noted that controller 118 may include a network interface (not shown) communicatively coupled to a network. It is noted that network interface (not shown) may include any network interface circuitry known in the art capable of communicating with network. For instance, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, LTE, WiFi protocols, RF, LoRa, and the like. By way of another example, network interface may operate via Bluetooth.

It is noted herein that the fabric drying apparatus 100 of the present disclosure may take many forms without departing from the spirit or scope of the present disclosure.

In one embodiment, the one or more processors 120, 220, 320 may include any one or more processing elements known in the art. In this sense, the one or more processors 120, 220, 320 may include any microprocessor-type device configured to execute software algorithms and/or instructions. In one embodiment, the one or more processors 120, 220, 320 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 120, 220, 320. In general, the term "processor" may be broadly defined to encompass any device having one or more processing elements, which execute program instructions from memory 122, 222, 322. Moreover, different subsystems of the apparatus 100, 200, 200 (e.g., fan 104, 204, 304, heating elements 106, 206, 306, power source 108, 208, 308, controller 118, 218, 318) may include processor or logic elements suitable for carrying out at least a portion of the steps described throughout the present disclosure. Therefore, the above description should not be interpreted as a limitation on the present disclosure but merely an illustration.

The memory 122, 222, 322 may include any storage medium known in the art suitable for storing program instructions executable by the associated one or more processors 120, 220, 320. For example, the memory 122, 222, 322 may include a non-transitory memory medium. For instance, the memory 122, 222, 322 may include, but is not limited to, a read-only memory (ROM), a random access memory (RAM), a magnetic or optical memory device (e.g., disk), a magnetic tape, a solid state drive and the like. It is further noted that memory 122, 222, 322 may be housed in a common controller housing with the one or more processors 120, 220, 320. In an alternative embodiment, the memory 122, 222, 322 may be located remotely with respect to the physical location of the processors 120, 220, 320, and controller 118, 218, 318, and the like. In another embodiment, the memory 122, 222, 322 maintains program instructions for causing the one or more processors 120, 220, 320 to carry out the various steps described through the present disclosure.

In one embodiment, the user interface 124, 224, 324 may include, but is not limited to, one or more desktops, tablets, smartphones, smart watches, or the like. In another embodiment, the user interface 124, 224, 324 includes a display used to display data of the apparatus 100, 200, 200 to a user. The display of the user interface 124, 224, 324 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 124, 224, 324 is suitable for implementation in the present disclosure. In another embodiment, a user may input selections and/or instructions responsive to data displayed to the user via the user interface 124, 224, 324.

It is noted that a network interface (not shown) of controller 118, 218, 318 may include any network interface circuitry or network interface device suitable for interfacing with a network. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, WiFi protocols, RF, LoRa, and the like.

Figure 2:
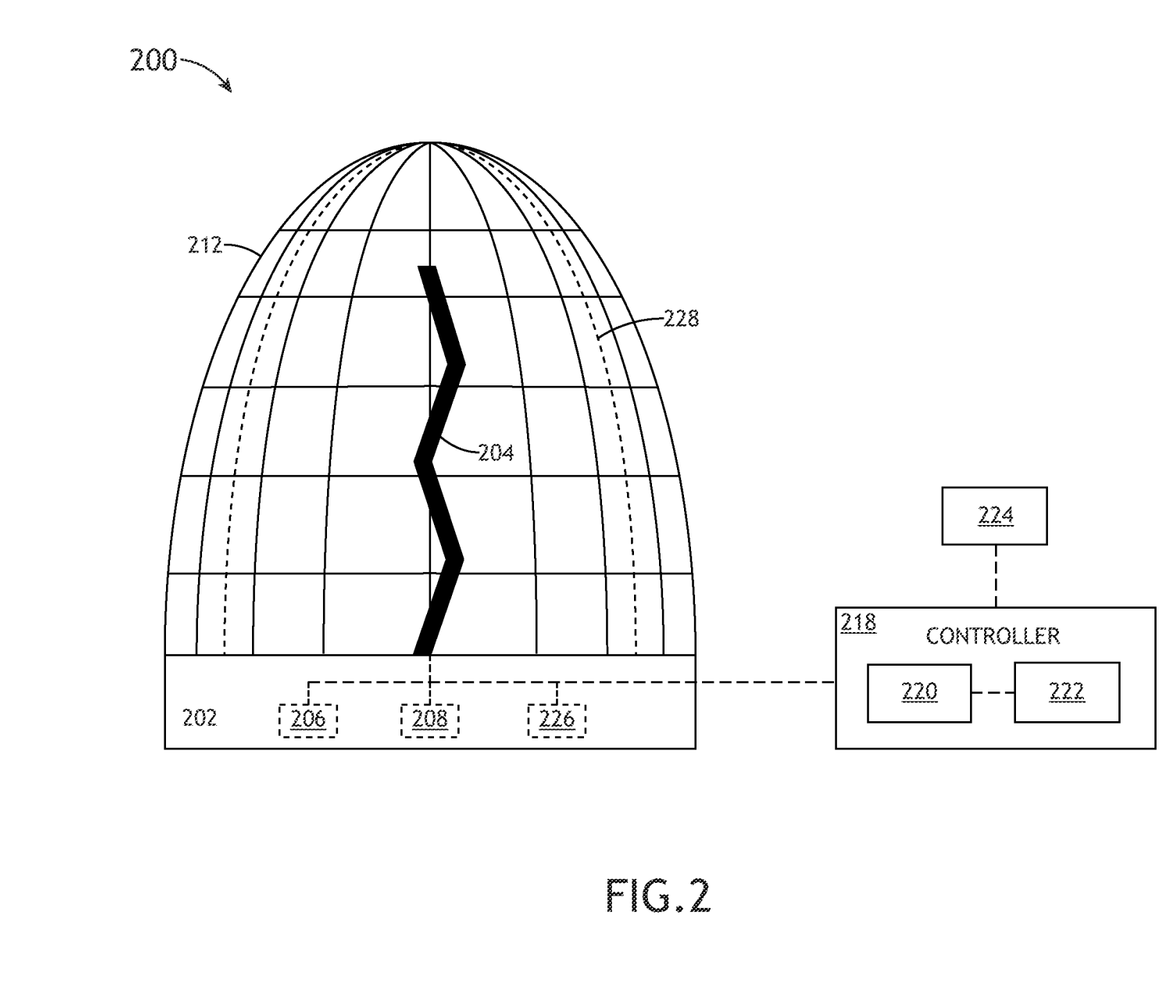
FIG. 2 illustrates a simplified conceptual diagram of an apparatus for drying articles of fabric, in accordance with one or more embodiments of the present disclosure.

FIG. 2 illustrates a simplified conceptual diagram of an apparatus 200 for drying articles of fabric, in accordance with one or more embodiments of the present disclosure.

Similar to apparatus 100, apparatus 200, may include a base 202, a fan 204, one or more heating elements 206, a power source 208, a controller 218, and a towel frame 212. The apparatus 200 may further include one or more sensors 226 and a desiccant material (e.g., desiccant structure 228). It is noted herein that any description associated with apparatus 100 depicted in FIG. 1 may be regarded as applying to apparatus 200 depicted in FIG. 2, unless noted otherwise herein. Conversely, any description associated with apparatus 200 depicted in FIG. 2 may be regarded as applying to apparatus 100 depicted in FIG. 1, unless noted otherwise herein.

In one embodiment, apparatus 200 may include a fan 204. In another embodiment, as shown in FIG. 2, fan 204 may be substantially located within the towel frame 212. In another embodiment, fan 204 may include any fan known in the art capable of directing air in one or more directions including, but not limited to, an omnidirectional fan, a rotating fan, an oscillating fan, a centrifugal fan, and the like. It is noted herein that a fan 204 capable of directing air in one or more directions may allow for a towel draped across towel frame 212 to receive a substantially even distribution of warm air, thereby maximizing the surface area of the towel exposed to the warm air. Furthermore, this may increase the rate at which a towel draped across towel frame 212 is dried and/or warmed.

In another embodiment, as discussed previously herein, apparatus 200 may include a towel frame 212. In another embodiment, towel frame 212 may take a semi-spherical or dome shape, as shown in FIG. 2. While the towel frame 212 shown in FIG. 2 exhibits a substantially dome shape, this is not to be regarded as a limitation of the present disclosure, and it is noted that the towel frame 212 may take any shape known in the art. Furthermore, it is noted herein that the discussion associated with towel frame 112 may also be regarded as applying to towel frame 212, unless noted otherwise herein.

Figure 3:
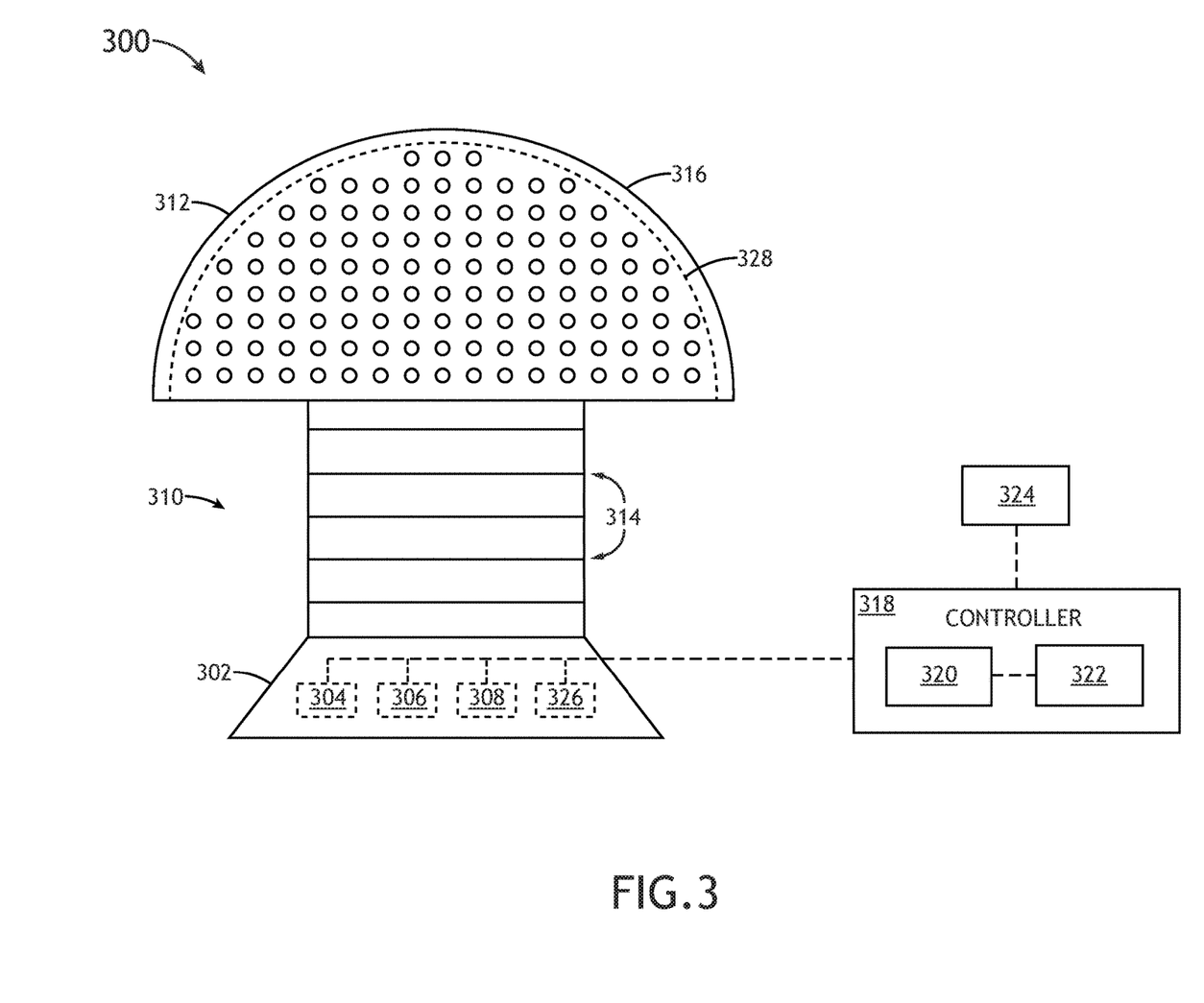
FIG. 3 illustrates a simplified conceptual diagram of an apparatus for drying smaller articles of fabric, in accordance with one or more embodiments of the present disclosure.

FIG. 3 illustrates a conceptual diagram of an apparatus 300 for drying smaller articles of fabric, in accordance with one or more embodiments of the present disclosure. It is noted herein that any description associated with apparatus 100, 200 depicted in FIGS. 1-2 may be regarded as applying to apparatus 300 depicted in FIG. 3, unless noted otherwise herein. Conversely, any description associated with apparatus 300 depicted in FIG. 3 may be regarded as applying to apparatus 100, 200 depicted in FIGS. 1-2, unless noted otherwise herein.

Apparatus 300 may include, but is not limited to, a base 302, a fan 304, one or more heating elements 306, a power source 308, a controller 318, a body 310, and a frame 312. The apparatus 300 may further include one or more sensors 326 and a desiccant structure 328.

In one embodiment, apparatus 300 may be sized and configured to dry smaller articles of fabric including, but not limited to, hand towels. In one embodiment, apparatus 300 may be designed to sit on a bathroom or kitchen countertop in order to dry hand towels, dish towels, wash cloths, and the like. By way of another example, it is contemplated that apparatus 300 may be integrated into a sink and/or a countertop. However, it is noted that these embodiments are not to be regarded as a limitation of the present disclosure. Furthermore, it is contemplated that apparatus 300 of the present disclosure may be portable.

In one embodiment, apparatus 300 may include a body 310 configured to direct air from the base 302 to the frame 312. As noted previously, it is contemplated that the body 310 may be sized such that a towel or other article draped across frame 312 may not touch the base 302 or the surface on which apparatus 200 is placed. For example, if apparatus 300 were configured to dry wash cloths, body 310 may be approximately 4 inches to 8 inches in length. By way of another example, if apparatus 300 were configured to dry hand towels, body 310 may be approximately 6 inches to 24 inches in length.

In another embodiment, body 310 may include one or more vents 314. As noted previously herein with regards to perforations 114, one or more vents 314 may allow warm air traveling through body 310 to exit body 310 and come into contact with a towel draped across frame 312. In this regard, one or more vents 314 may maximize the surface area of the towel in contact with warm air, and allow apparatus 200 to more efficiently and effectively dry and/or warm towels. It is noted herein that the body 310 including one or more vents 314 may alternatively include one or more perforations, as discussed in association with perforations 114. Furthermore, it is noted that apparatus 100 may alternatively include one or more vents similar to the one or more vents 314.

In another embodiment, apparatus 300 may include a frame 312. In another embodiment, frame 312 may be configured to allow for towels to be draped across the frame 312 in a manner which may minimize bunching and/or folding. For example, frame 312 may be configured to allow a hand towel to be draped across the frame 312 such that the towel lays substantially flat against the frame 312. In another embodiment, frame 312 may include one or more perforations 316, wherein the one or more perforations are configured to facilitate the flow of warm air from inside the frame 312 to the surface of the towel.

Figure 4A:
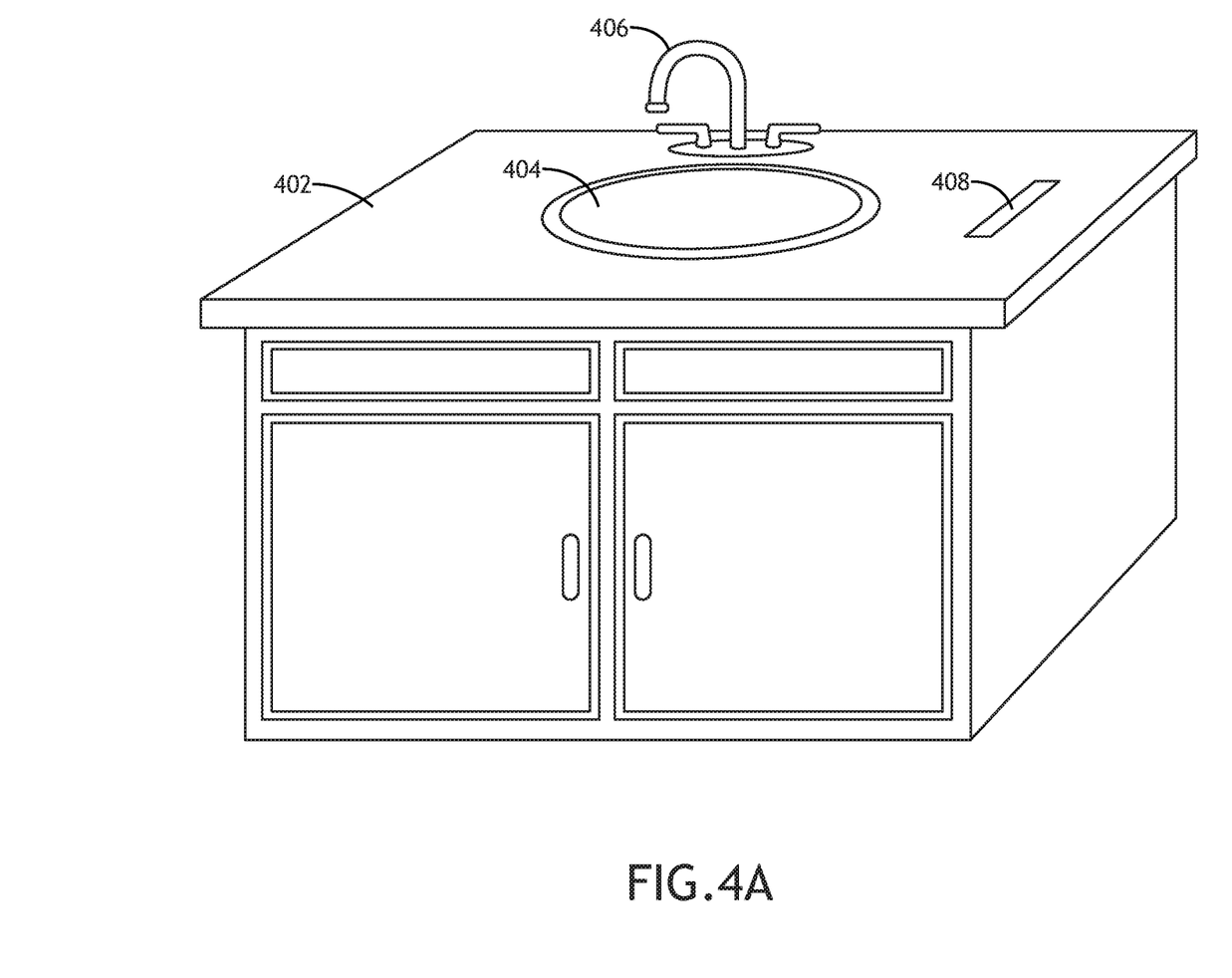
FIG. 4A illustrates a fabric drying apparatus 200 disposed within a countertop in a stored position, in accordance with one or more embodiments of the present disclosure.
Figure 4B:
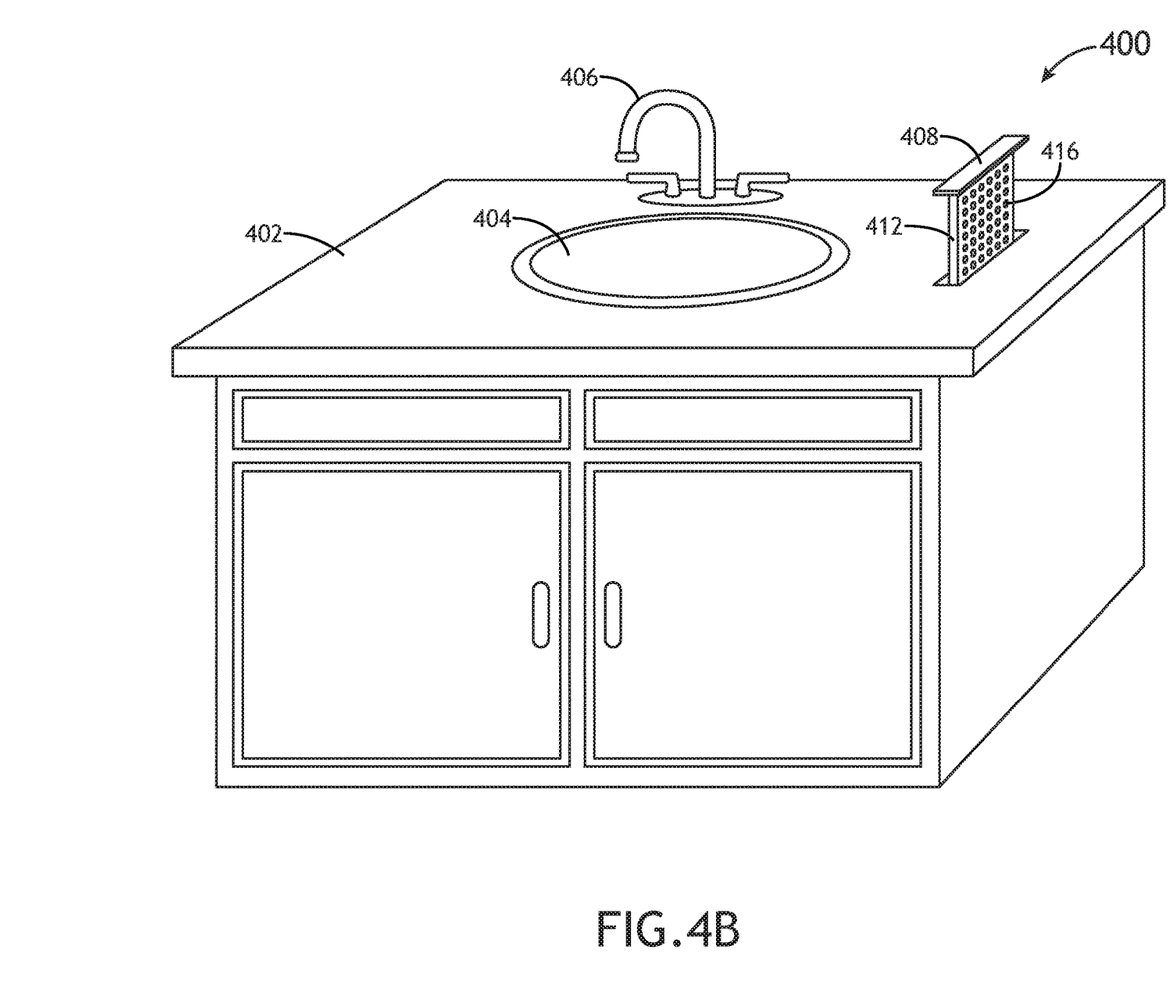
FIG. 4B illustrates a fabric drying apparatus 200 disposed within a countertop in a stored position, in accordance with one or more embodiments of the present disclosure.

FIG. 4A illustrates a fabric drying apparatus 400 disposed within a countertop 402 in a stored position, in accordance with one or more embodiments of the present disclosure. FIG. 4B illustrates a fabric drying apparatus 400 disposed within a countertop 402 in an active position, in accordance with one or more embodiments of the present disclosure. It is noted herein that any description associated with apparatus 100, 200, 300 depicted in FIGS. 1-3 may be regarded as applying to apparatus 400 depicted in FIGS. 4A-4B, unless noted otherwise herein. Conversely, any description associated with apparatus 400 depicted in FIGS. 4A-4B may be regarded as applying to apparatus 100, 200, 300 depicted in FIGS. 1-3, unless noted otherwise herein.

In an additional and/or alternative embodiment, it is contemplated that a fabric drying apparatus of the present disclosure (e.g., apparatus 100, 200, 300, 400, and the like) may be recessed into the countertop 402 of a kitchen or bathroom for increased accessibility and storage. For example, as shown in FIG. 4A, apparatus 400 may be configured such that it may be stored within a countertop 402 when it is not in use. The countertop 402 may include a sink 404 and a faucet 406. In one embodiment, the apparatus 400 may be flush, or substantially flush, with the top surface of the countertop when it is in a "stored"

position. The apparatus 400 and/or countertop 402 may include a panel 408 which is configured to cover a recess within the countertop 402 such that the panel 408 is flush, or substantially flush, with the countertop 402 when the apparatus 400 is in the stored position.

In another embodiment, the apparatus 400 may be raised above the countertop 402 such that articles of fabric may be draped across it when it is in an "active" position. For example, as shown in FIG. 4B, apparatus 400 may be disposed above the surface of the countertop 402 in an active position. It is contemplated that a user may press down on panel 408 and/or apparatus 400 when it is flush with a countertop 402 in a "stored" position when the user desires to dry an article of fabric. When the user presses down on apparatus 400, apparatus 400 may be unlocked from its "stored" position and extend up through an opening in the countertop 402 into its "active" position. In this regard, the panel 408 may include an actuatable panel configured to actuate between a stored and active position in order to allow the apparatus 400 to be raised above the surface of the countertop 402. Once in the "active" position, the user may then drape articles of fabric over apparatus 400 in order to dry. As shown in FIG. 4B, apparatus 400 may include a frame 412 including one or more perforations 416 configured to direct an air stream through the frame to a surface of an article of fabric disposed on the frame 412 of the apparatus 400.

In a similar manner, once the user has finished drying, the user may then press down on apparatus 400, thereby forcing apparatus 400 down through the opening in the countertop 402 into its "stored" position for storage. In a similar manner, apparatus 400 may be configured such that it may be stored within a wall when it is not in use. In this regard, apparatus 400 may be flush, or substantially flush, with a wall in a "stored" position when it is not in use, and extend out from the wall in an "active" position when it is being used. It is contemplated that any method known in the art may be used to transition between the "stored" and "active" positions including, but not limited to, mechanical force, electrical signals (e.g., electrical switches, electrical buttons, and the like), and the like.

It is noted herein that the examples described above are made only for purposes of illustration, and should not be regarded as limiting. In this regard, it is contemplated that any design which allows for a fabric drying apparatus of the present disclosure (e.g., apparatus 100, 200, 300, 400) to be integrated into a surface (e.g., countertop, floor, wall, or the like) for easy storage and accessibility is within the spirit and scope of the present disclosure.

Figure 5:
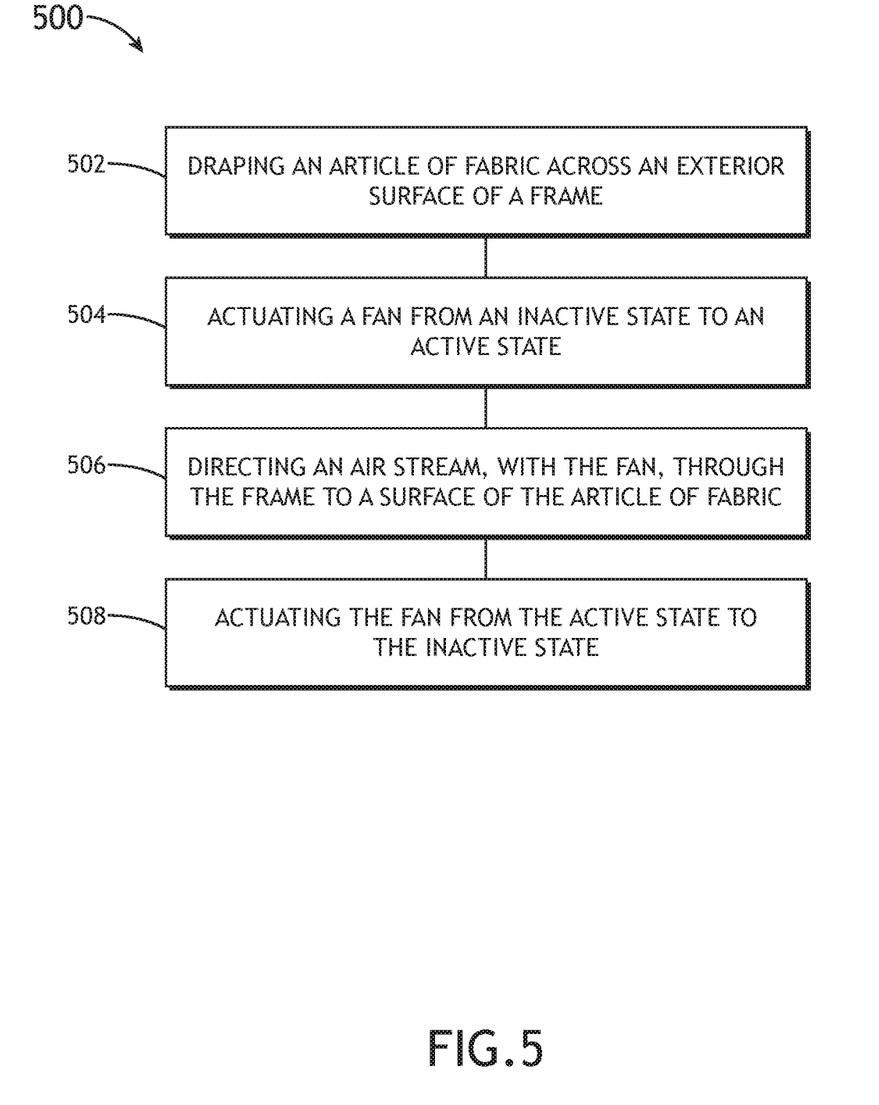
FIG. 5 illustrates a process flow diagram depicting a method for drying articles of fabric, in accordance with one or more embodiments of the present disclosure.

FIG. 5 illustrates a process flow diagram depicting a method 500 for drying articles of fabric, in accordance with one or more embodiments of the present disclosure. It is noted herein that the steps of method 500 may be implemented all or in part by apparatus 100, 200, 300, 400. It is further noted, however, that method 500 is not limited to apparatus 100, 200, 300, 400 in that additional or alternative system-level embodiments may carry out all or part of the steps of method 500.

In a step 502, an article of fabric is draped across an exterior surface of a frame. For example, a frame may be configured to allow an air stream to pass through the frame. In this regard, it is noted that the frame may be constructed in any number of ways which may allow air to pass through the frame. For example, the frame may comprise multiple wires forming a grid-like pattern. By way of another example, the frame may include a solid structure, wherein the solid structure includes a set of perforations which allow for the passage of air through the frame. Furthermore, it is noted that the frame may include any frame shape known in the art including, but not limited to, substantially spherical, substantially semi-spherical, substantially conical, substantially rectangular, substantially planar, and the like.

In a step 504, a fan is actuated from an inactive state to an active state. For example, a controller 118 may be configured to generate one or more control signals, wherein the one or more control signals are configured to actuate a fan 104 from an inactive state to an active state. The controller 118 may be configured to generate the one or more control signals in response to one or more input commands received from a user interface 124. By way of another example, the controller 118 may be configured to generate the one or more control signals in response to one or more data readings collected by one or more sensors 126. For instance, a pressure sensor may acquire one or more pressure readings indicating a towel has been placed over the frame 112. The one or more processors 120 of the controller 118 may be configured to receive the pressure readings, and generate one or more control signals configured to actuate the fan 104 from an inactive state to an active state.

In a step 506, an air stream is directed, with the fan, through the frame to the surface of the article of fabric. In another embodiment, a fan may be configured to direct air from a base to the interior surface of the frame. It is noted that the fan may include any device known in the art which is configured to direct air. For example, the fan may include, but is not limited to, an axial-flow fan, a centrifugal fan, a cross-flow fan, a blower, a rotating fan, an omnidirectional fan, an oscillating fan, a helical blade agitator fan, a spiral or auger type fan, and the like.

As noted previously herein, the frame may include one or more perforations which allow for air to pass from one surface of the frame to the opposite surface of the frame, thereby allowing air to pass to the surface of an article of fabric draped across the exterior surface of a frame. By way of another example, the frame may include a frame made up of a series of wires forming a grid-like pattern. It is noted herein that air may be passed through the frame from either direction. For example, the fan on the interior of the frame may direct air through the frame such that air passes from the interior surface of the frame to the exterior surface of the frame. By way of another example, the fan on the interior of the frame may operate in reverse, thereby directing (e.g., "sucking") air through the frame such that air passes from the exterior surface of the frame to the interior surface of the frame. In this regard, it is contemplated that the fan of the present disclosure may include a reversible fan.

In another embodiment, the air stream may be heated with one or more heating elements. For example, one or more heating elements 106 may be configured to heat the air stream from the fan 104 prior to the air stream contacting the article of fabric. In one embodiment, the one or more heating elements may be included in a base, wherein the base is attached to the frame, wherein the base includes one or more vents which allow air to enter the base. For example, the one or more heating elements may include, but are not limited to, one or more resistive heaters, one or more ceramic heaters, one or more radiant infrared (IR) heaters, one or more heat lamps, and the like.

In a step 508, the fan is actuated from the active state to the inactive state. For example, a controller 118 may be configured to generate one or more control signals, wherein the one or more control signals are configured to actuate a fan 104 from the active state to the inactive state. The controller 118 may be configured to generate the one or more control signals in response to one or more input commands received from a user interface 124 and/or one or more data readings collected by one or more sensors 126. For instance, a pressure sensor may acquire one or more pressure readings indicating a towel has been removed from the frame 112. The one or more processors 120 of the controller 118 may be configured to receive the pressure readings, and generate one or more control signals configured to actuate the fan 104 from the active state to the inactive state.

It is further contemplated that each of the embodiments of the method described above may include any other step(s) of any other method(s) described herein. In addition, each of the embodiments of the method described above may be performed by any of the systems described herein.

In another embodiment, the control circuitry (not shown) may include one or more processors and memory, wherein the one or more processors are configured to execute a set of program instructions stored in memory. In another embodiment, the set of program instructions may be configured to cause the one or more processors to carry out one or more functions of the present disclosure. For example, the program instructions may be configured to cause the one or more processors to adjust one or more characteristics and/or settings of the fan 104, 204, 304, the heating elements 106, 206, 306 or the power source 108, 208, 308.

The one or more processors may include any one or more processing elements known in the art. In this sense, the one or more processors may include any microprocessor-type device configured to execute software algorithms and/or instructions. In one embodiment, the one or more processors may consist of a desktop computer, mainframe computer system, workstation, image computer, parallel processor, or other computer system (e.g., networked computer) configured to execute a program configured to operate the apparatuses 100, 200, 300 as described throughout the present disclosure. It should be recognized that the steps described throughout the present disclosure may be carried out by a single computer system or, alternatively, multiple computer systems, remote computer systems, or distributed computer systems. In general, the term "processor" may be broadly defined to encompass any device having one or more processing elements, which execute program instructions from memory. Moreover, different subsystems of the apparatuses 100, 200, 300, 400 (e.g., fans 104, 204, 304, the heating elements 106, 206, 306, or the power sources 108, 208, 308) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors. For example, the memory may include a non-transitory memory medium. For instance, the memory may include, but is not limited to, a read-only memory (ROM), a random access memory (RAM), a magnetic or optical memory device (e.g., disk), a magnetic tape, a solid state drive and the like. It is further noted that memory may be housed in a common controller housing with the one or more processors. In an alternative embodiment, the memory may be located remotely with respect to the physical location of the processors. For instance, the one or more processors may access a remote memory (e.g., server), accessible through a network (e.g., internet, intranet and the like). In another embodiment, the memory maintains program instructions for causing the one or more processors to carry out the various steps described through the present disclosure.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that embodiments of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An apparatus for drying articles of fabric, comprising:
a frame configured to receive an article of fabric, wherein the frame has a dome shape to support an the article of fabric for drying, wherein the dome shape is configured for draping the article of fabric across the frame such that the article of fabric lays substantially flat against the frame:
a body including an adjustable height, wherein the body is configured to extend or compress to prevent the article of fabric from contacting the base, wherein the body includes one or more vents;
a base fluidically coupled to the frame via the body;
a fan disposed within the base, wherein the fan is configured to direct an air stream through the frame and out through the vents in the body to the article of fabric to dry the article of fabric; and
a desiccant structure positioned within the frame, wherein the desiccant structure comprises a desiccant material configured to dry the air stream prior to the air stream passing through the frame, wherein the desiccant structure comprises at least one of a mesh or lattice structure.

2. The apparatus of claim 1, wherein the fan comprises at least one of an oscillating fan, a centrifugal fan, a cross-flow fan, an axial-flow fan, a blower, a rotating fan, or a helical blade agitator fan.

3. The apparatus of claim 1, further comprising one or more heating elements configured to heat the air stream.

4. The apparatus of claim 3, wherein the one or more heating elements comprise at least one of:
one or more resistive heaters,
one or more ceramic heaters,
one or more radiant infrared (IR) heaters, or
one or more heat lamps.

5. The apparatus of claim 1, further comprising a sanitizer device configured to kill bacteria.

6. The apparatus of claim 5, wherein the sanitizer device comprises at least one of an ultraviolet (UV) radiant device or a sanitizer light.

7. The apparatus of claim 1, further comprising an air freshener device configured to freshen the air stream.

8. The apparatus of claim 1, further comprising a controller communicatively coupled to the fan, wherein the controller includes one or more processors configured to execute program instructions causing the one or more processors to:
actuate the fan from an inactive state to an active state to direct the air stream through the frame to the article of fabric; and
actuate the fan from the active state to the inactive state after a humidity sensor detects a humidity reading at a predefined humidity level.

9. The apparatus of claim 1, further comprising a controller communicatively coupled to the fan, wherein the controller includes one or more processors configured to execute program instructions causing the one or more processors to:
actuate the fan from an inactive state to an active state to direct the air stream through the frame to the article of fabric after a pressure sensor indicates that the article of fabric is placed on the frame.

10. An apparatus for drying articles of fabric, comprising:
a frame configured to receive an article of fabric, wherein the frame has a dome shape to support the article of fabric for drying, wherein the dome shape is configured for draping the article of fabric across the frame such that the article of fabric lays substantially flat against the frame;
a body including an adjustable height, wherein the body is configured to extend or compress to prevent the article of fabric from contacting the base, wherein the body includes one or more vents;
a base fluidically coupled to the frame via the body;
a fan configured to direct an air stream through the frame and out through the vents in the body to the article of fabric to dry the article of fabric;
a desiccant structure positioned within the frame, wherein the desiccant structure comprises a desiccant material configured to dry the air stream prior to the air stream passing through the frame, wherein the desiccant structure comprises at least one of a mesh or lattice structure; one or more humidity sensors; and
a controller communicatively coupled to the fan, wherein the controller includes one or more processors configured to execute program instructions causing the one or more processors to:
actuate the fan from an inactive state to an active state to direct the air stream through the frame to the article of fabric; and
actuate the fan from the active state to the inactive state after a humidity sensor detects a humidity reading at a predefined humidity level.

11. The apparatus of claim 10, further comprising at least one of one or more temperature sensors, or one or more moisture sensors.

12. A system for drying articles of fabric, comprising:
a frame configured to receive an article of fabric, wherein the frame is configured to support the article of fabric for drying, wherein the frame is configured to allow the article of fabric to drape across the frame such that the article of fabric lays substantially flat against the frame;

a body including an adjustable height, wherein the body is configured to extend or compress to prevent the article of fabric from contacting the base, wherein the body includes one or more vents;

a base fluidically coupled to the frame via the body;

a fan disposed within the base, wherein the fan is configured to direct an air stream through the frame and out through the vents in the body to the article of fabric to dry the article of fabric; and a desiccant structure positioned within the frame, wherein the desiccant structure comprises a desiccant material configured to dry the air stream prior to the air stream passing through the frame, wherein the desiccant structure comprises at least one of a mesh or lattice structure; and a panel, wherein the frame is configured for housing within a recess of at least one of a kitchen or bathroom countertop when in a stored position, wherein the panel is configured to cover a recess within the countertop, wherein the panel may be flush or substantially flush with a top surface of the countertop when in the stored position.

13. The system of claim 12, wherein the panel is configured to actuate between the stored position and an active position upon receipt of a downward force via a user.

* * * * *